No. 842,328. PATENTED JAN. 29, 1907.
T. J. MYERS.
HARVESTER REEL.
APPLICATION FILED SEPT. 11, 1906.
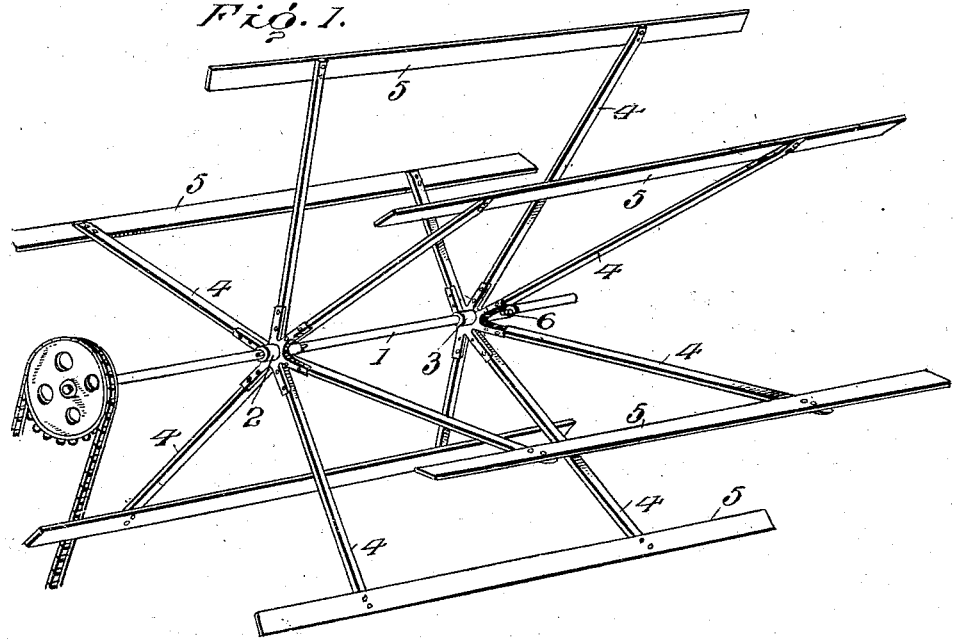
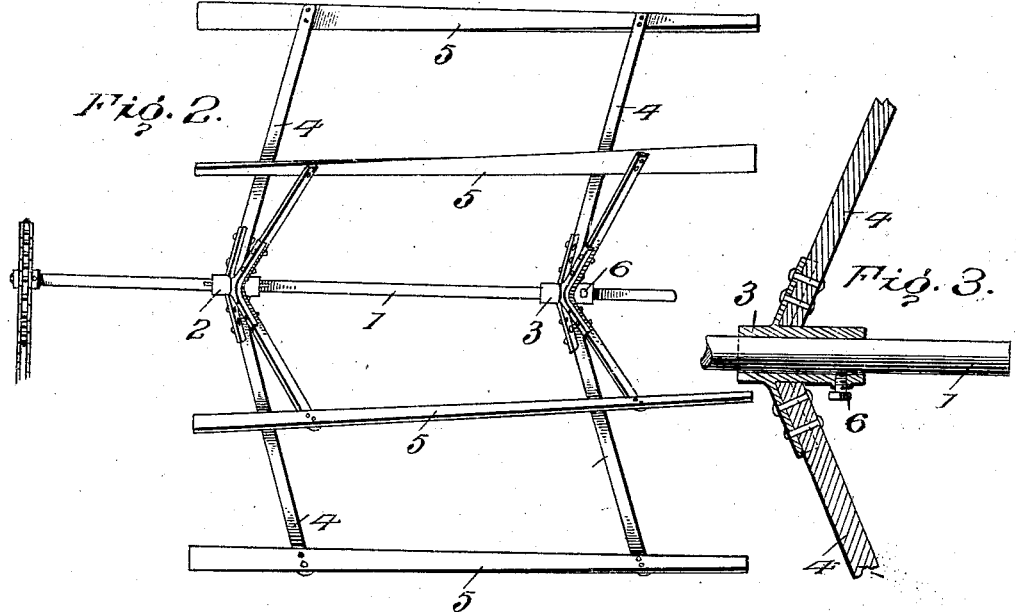
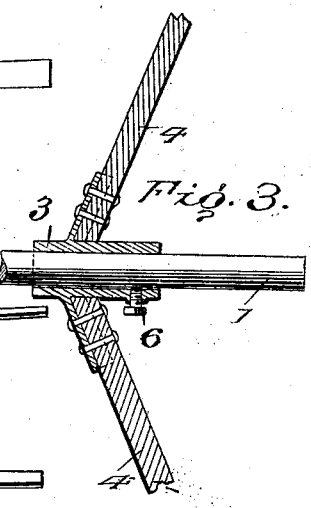

UNITED STATES PATENT OFFICE.

THADDEUS J. MYERS, OF ROSSVILLE, KANSAS.

HARVESTER-REEL.

No. 842,328.  Specification of Letters Patent.  Patented Jan. 29, 1907.

Application filed September 11, 1906. Serial No. 334,168.

*To all whom it may concern:*

Be it known that I, THADDEUS J. MYERS, a citizen of the United States, residing at Rossville, in the county of Shawnee and State of Kansas, have invented certain new and useful Improvements in Harvester-Reels, of which the following is a specification.

The purpose of the present invention is the provision of a harvester-reel of novel formation and capable of angular adjustment, so as to gather the grain before it strikes the cutter and to turn it with the heads of grain toward the outside of the platform after being cut, thereby preventing short light grain from coming up heads first.

A further purpose of the invention is the provision of an adjustable reel which, while capable of angular adjustment, will not interfere with raising or lowering of the reel or throwing the same backward or forward.

In accordance with this invention the harvester-reel comprises a shaft, end collars, arms radiating from the collars, and slats attached to the outer ends of the arms, one of said collars being relatively fixed, whereas the opposite collar is adapted to be turned on the shaft to admit of adjusting the slats angularly to any relative position that may be required.

In the accompanying drawings, forming a part of the specifications, Figure 1 is a perspective view of a harvester-reel embodying the invention. Fig. 2 is a plan view showing the slats adjusted to an angular position. Fig. 3 is a sectional view of the adjustable collar, showing a portion of the shaft and arms.

Corresponding and like parts are referred to in the following description and indicated in all the views of the drawings by the same reference characters.

The reel comprises a shaft 1, collars 2 and 3, the former relatively fixed and the latter relatively adjustable, arms 4, and slats 5.

The shaft 1 may be of usual construction and is provided near each end with the collars 2 and 3, which are approximately of like formation, with the exception that the collar 2 is fixed, whereas the collar 3 is adjustable. Each collar comprises a hub portion and extensions radiating therefrom and to which the inner ends of the arms 4 are bolted or otherwise secured. The collar 3 is provided in a side of its hub portion with a threaded opening, in which is fitted a set-screw 6, by means of which said collar is secured to the shaft in the desired position. The slats 5 are bolted or fastened to the outer ends of the arms 4 in any accustomed way.

When the corresponding arms at opposite ends of the reel aline transversely, the slats 5 are parallel with one another and with the shaft 1. When it is required to adjust the slats, so as to incline with reference to the shaft 1, the set-screw 6 of the collar 3 is loosened, and the fastenings connecting the slats to the arms are also loosened, and, if needs be, the fastenings connecting the arms to the collars may be slackened, the purpose being to admit turning of the collar 3 upon the shaft, so as to throw corresponding arms out of transverse alinement and cause the slats to incline with reference to the shaft more or less, either forward or backward, as may be required. After the parts have been adjusted to give the proper inclination to the slats the set-screw 6 is retightened, as well as the fastenings which were previously loosened. By inclining the slats substantially as shown in Fig. 2 the grain is gathered before reaching the cutter-bar and after being cut is inclined with the heads toward the outside of the platform.

The improvement may be applied to any style of harvester-reel embodying the parts herein disclosed.

Having thus described the invention, what is claimed as new is—

The herein-described harvester-reel comprising a shaft, collars mounted upon said shaft, the one fixed thereto, the other being loose, each of said collars comprising radial extensions and a hub portion, arms secured at their inner ends to the said radial extensions of the respective collars, slats attached to the outer ends of the corresponding arms and a set-screw threaded into an opening of the hub of the movable collar and adapted to engage with the shaft and secure the movable collar in the adjusted position.

In testimony whereof I affix my signature in presence of two witnesses.

THADDEUS J. MYERS. [L. S.]

Witnesses:
J. H. MILLS,
J. T. HOPKINS.